Dec. 8, 1931.   J. KIRBY   1,835,114
AUTOMATIC GRID WINDING MACHINE
Filed Dec. 10, 1926
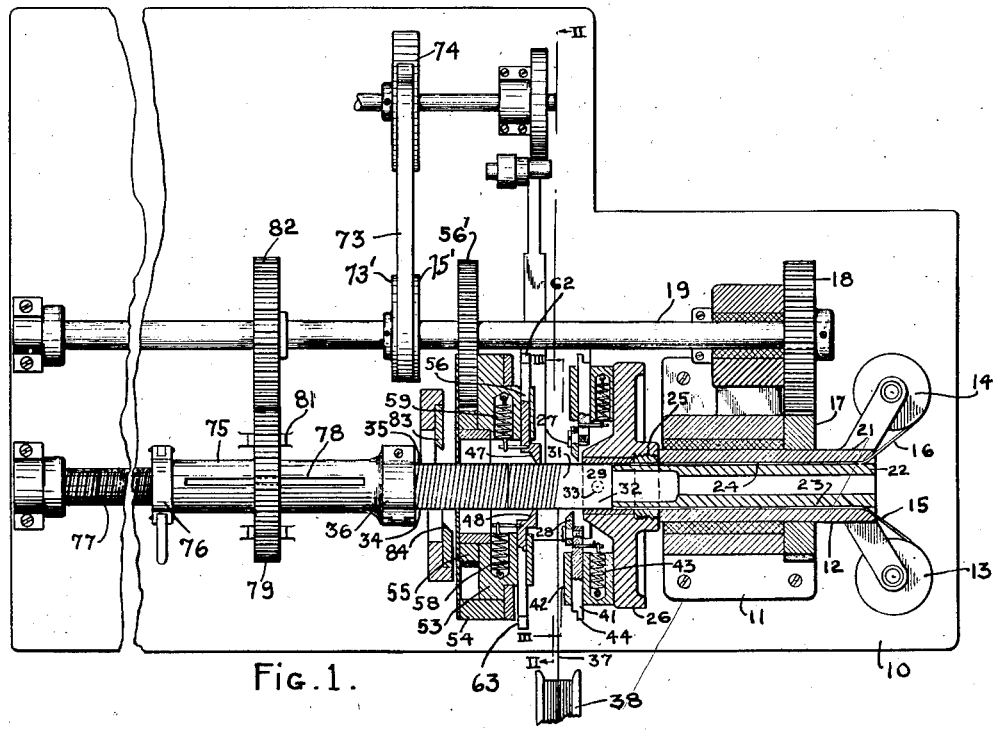
Fig.1.
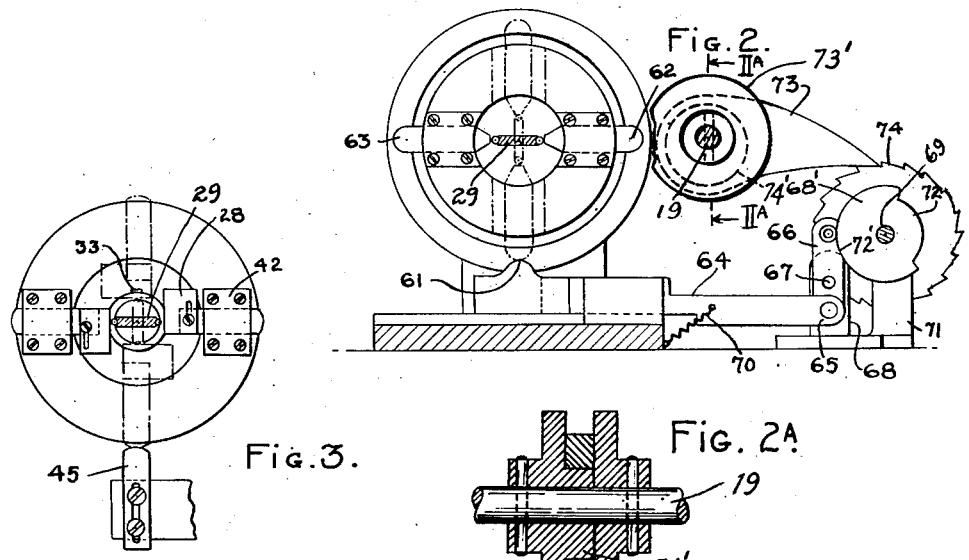
Fig.2.   Fig. 2A.
Fig.3.
Fig.4.   Fig.5.   Fig.6.
Joseph Kirby
INVENTOR
BY
ATTORNEY Patented Dec. 8, 1931

1,835,114

UNITED STATES PATENT OFFICE

JOSEPH KIRBY, OF NEWARK, NEW JERSEY, ASSIGNOR TO WESTINGHOUSE LAMP COMPANY, A CORPORATION OF PENNSYLVANIA

AUTOMATIC GRID WINDING MACHINE

Application filed December 10, 1926. Serial No. 153,798.

This invention relates to machines for the manufacture of electrodes such as a grid structure for electrical device and more particularly to machines of the type disclosed in Patent 1,585,905 relating to a machine for the manufacture of radiotron grids.

The above mentioned patent provides for the rapid and automatic production of a grid comprised of a pair of relatively heavy wires, termed "support-wires" about which relatively fine wire termed a "grid-wire" is helically wound and secured by a welding operation at the points of contact between the grid and support wires. This results in an article somewhat similar to a lattice work structure constituting an enclosure or cage, and is known as a wound grid as distinguished from others such as those formed by a stamping operation from a sheet of metal.

Although the above mentioned patent relates generally to the automatic union of a grid wire to supports, the example given comprises a welding operation. It has been proposed, however, to secure the grid-wire to the supports by forming a series of grooves in the supports, introducing the grid-wire into the grooves and in closing the edges of the grooves to hold the grid-wire therein.

In producing a grid by the above method, the support-wires were slotted by contact with a cutter, usually a rotary cutter. The support-wires being disposed on a mandrel and rotated therewith so that at each revolution of the mandrel a slot would be cut or where two cutters were employed, upon each half of a revolution. The support wires were moved over the mandrel and the same operations employed as disclosed in the above mentioned patent, the cutting members taking the place of the welding hammer and additional means being employed to close the slots.

In the machines as referred to for slotting the support-wires, it has been found that owing to the rolling action or substantially laterally initial contact between the cutters and the wire, a cumulative torsional effect is imparted to the support-wires so that the finished grid has a tendency to twist and at the same time to bow or take an arcuate form. This distortion of the grid makes it necessary to perform additional operations consisting of annealing and straightening before the grid becomes useful as an electrode for enclosing a filament or cathode in an electrical device.

An object of the present invention, therefore, is to provide a machine for producing a grid of the character above set forth in a more efficient and expeditious manner.

Another object of the invention is to produce a grid structure free from strains and distortions.

Another object of the invention is to so form slots in a support wire as to facilitate the operation of securing a grid wire therein.

Other objects and advantages of the invention will be more fully understood by reference to the accompanying drawings in which:

Fig. 1 is a plan view of a machine embodying the present invention.

Fig. 2 is a view taken substantially on line II—II in Fig. 1 and shows the hammer mechanism.

Fig. 2a is an enlarged cross sectional view of ratchet mechanism taken on line II$^a$—II$^a$ in Fig. 2.

Fig. 3 is a view taken on line III—III in Fig. 1 and shows the cutter for slotting the support-wires.

Fig. 4 is an enlarged view of a portion of a support-wire showing a slot with a grid-wire therein.

Fig. 5 is an enlarged transverse sectional view of a wire, the section being taken substantially in the center of the width of a slot.

Fig. 6 shows a hammer in contact with a support-wire to close the edges of a slot about a grid-wire.

A machine for practicing the present invention may comprise a bed-plate or support 10 having a suitable bearing 11 secured thereto. Rotatably disposed in the said bearing is rotary element or winding head 12 upon which a pair of spools 13 and 14 are mounted. These spools supply support-wires 15 and 16 to constitute the lateral members of a grid. The head 12 is provided with a spur-gear wheel 17 disposed in mesh with a gear-wheel 18 on a shaft 19. This shaft is disposed in suitable bearings and constitutes the main driving shaft of the machine. Power for rotating the shaft may be derived from any convenient source (not shown).

The head 12 includes a hollow spindle 21 in which a sleeve 22 is disposed. This sleeve is provided with grooves 23 and 24 for the passage of support-wires 15 and 16 respectively. The inner end of the sleeve is provided with a threaded portion 25 to receive a carrier 26 for cutters or slot-forming members 27 and 28, the operation of which will be presently described. At the inner end of the sleeve 22 and extending from the carrier 26 is an arbor or mandrel 29. The effective portion 31 of the mandrel has a transverse cross-sectional configuration the same as the interior of the grid to be produced and is provided with a shank portion 32 which may be disposed between two half round inserts and secured by a set screw 33. It will be understood that in the event that a grid having only one support-wire is to be made that the arbor may be modified accordingly, a machine showing the formation of one popular type of grid being illustrated merely as an example of one practical embodiment of the invention.

The arbor 29 may extend from the carrier 26 and may be grooved to provide continuations of the grooves 23 and 24 in the sleeve 22 so that the support-wires will be properly guided, their ends 34 and 35 being secured in a rotatable clamp 36. This clamp as will be explained rotates in unison with the winding head 12. Grid-wire 37 may be led from a suitably supported spool to the support-wires for winding therearound.

Inasmuch as in the present machine the support-wire is secured by a grooving and hammering operation, the carrier 26 is provided with the reciprocal cutters or slotting members 27 and 28. Each cutter is disposed at one end of a guide-rod 41 slidable in a guide 42 suitably secured to the carrier 26. Each cutter is provided with a helical spring 43 which serve to normally move the cutters away from the support-wires. The cutters are more in the nature of impact members and form the grooves by a compressive action since upon a rotation of the head 12, the ends 44 of the guides 41 engage with a contact member 45 (see Fig. 3), to drive them in a radial direction with respect to the longitudinal axis of the arbor. The cutters are so disposed as to be engageable with opposite wires and so arranged as to provide notches or slots 46 for the support-wires 15 and 16 in accordance with the pitch of the wire to be wound. The position of the notches will, of course be determined by the rate of speed at which the support-wires are moved longitudinally over the arbor and the notches produced in accordance therewith.

After the slots are made and the grid-wire 37 is wound therein by reason of the rotation of the arbor; mechanism comprising hammers 47 and 48 operable are moved for impact with the edges 51 and 52 of the slots to deform or displace them to lock the wires in the slots.

The hammers or impact members 47 and 48 are mounted in a rotary guide 53 disposed in a bearing 54 secured to the support 10 of the machine. The guide 53 may be provided with a gear-wheel 55 in mesh with a gear-wheel 56 secured to the main driving shaft 19 so that the rotary-guide 53 is rotated with and in fixed relation to the carrier 26 which rotates the cutters 27 and 28. The hammers 47 and 48 are reciprocal in guides 56 and 57 and are normally held away from the support-wires by springs 58 and 59. The hammers are actuated for impact with the slots by means of a cam member 61 with which ends 62 and 63 of the hammers 47 and 48 respectively engage as the rotary guide 53 brings the support-wires successively into position for impact with the edges of the slots.

When a continuous strip of grid is desired, the hammers may be operated continuously but in the manufacture of a grid it is preferable to make a relatively long grid strip and subsequently cut the same into short lengths of the proper size for use in an electrical device. For this purpose the present machine operates to terminate the actuation of the hammers at intervals, leaving a strip with portions having unsecured wire, such termination being effected by mounting the cam 61 on a slidable arm 64 having an end 65 pivoted to a lever 66 pivoted at 67 on a post 68. An arm of the lever 66 is engageable with a rotary cam 68' secured to a shaft 69 mounting in a bearing 71. A spring 70 serves to normally move the lever 66 toward the cam. When the lever 66 is in contact with the surface 72' of the cam, the hammers 47 and 48 will operate and when the cam has been moved to bring the drop portion 72 adjacent to the lever 66, the slidable arm 64 will move to remove the cam-member 61 from contact with the ends 62 and 63 of the hammers. Thus during a given movement of the support-wires the grid-wire will not be secured thereto so as to provide projecting unwound legs at the ends of short sections of the grid strip when the same is cut to constitute electrodes.

Means for rotating the cam 68 may comprise a dog or ratchet 73 mounted loosely on the driving shaft 19. This ratchet mechanism may be of any well known construction and, as shown in Figure 2a, the shaft 19 may have a flange 73' pinned thereon. This flange is provided with an eccentric hub 74' on which is mounted the dog 73. A flange 75' is pinned to shaft 19 to retain the dog in position on the hub 74'. Inasmuch as the dog 73 is offset with respect to the axis of rotation of the shaft 19, a rotation of this shaft will cause a reciprocable movement of the dog to intermittently actuate a ratchet wheel 74 secured to and rotatable with the shaft 69 upon which cam 68' is mounted. A rotation of the driving shaft will obviously cause a gradual rotation of cam 68' which operates by reason of its configuration to actuate or terminate the actuation of the hammers. It will be evident that the relative dimensions of effective surfaces of the cam 68' may be so proportioned as to produce grid strips having sections of unsecured wire at intervals of varying distances or that the unsecured portions of the grid may be greater or lesser as desired.

The mechanism for causing a longitudinal movement of the support-wires 15 and 16 may be generally the same as disclosed in the above mentioned patent. As herein illustrated, however, the rotatable clamp 36 is disposed at one end of a tubular member 75 provided with a split-nut 76 for engagement with a suitably supported screw 77. The tubular member 75 is provided with a slot 78 and a gear-wheel 79 is keyed therein. The gear-wheel may be held by lateral bearings 81 so that a rotation of the gear-wheel will cause a rotary and lineal movement of the member 75 to move the support-wires 15 and 16 from their spools and over the mandrel or arbor 29. The gear-wheel 79 may be in mesh with a gear-wheel 82 rotatable with the driving shaft 19.

When the tubular member has moved the full length of its travel a pair of shearing members 83 and 84 may be actuated as by a foot treadle (not shown) to sever the support-wires 15 and 16 so the grid-strip may be removed. The clamp 36 may then be opened and the grid-strip removed to be cut into sections of suitable size. The tubular member 75 may then be returned to its initial position by releasing the nut 76 from the screw 77. When a new strip is to be wound, the free ends of the support-wires may be secured by the clamp 36 and the nut 76 closed upon the screw 77, the machine being then ready to start to wind a new strip.

The present invention provides a mechanism which operates to effectively secure a grid-wire to support-wires and by reason of the absence of relative lateral movement between cutters or slotting members the slots are cut uniformly and without distortion of the support wire owing to the unidirectional travel of the members which perform the slotting and hammering operations. The slots formed in the supports are of such relatively small dimensions as to be more in the nature of nicks and a grid of the present type is known as a "nicked" grid. The displacement of the edges of the slots or nicks to secure the support-wires is generally known as "beading".

A grid-strip produced by the present machine is obviously a more desirable product since it has the required uniformity and is free from tensional stresses and may be cut in sections and used without the additional cost of time and labor heretofore required to produce a uniform product.

Although a preferred embodiment of the invention is shown and described herein it is to be understood that modifications may be made therein without departing from the spirit and scope of the invention as set forth in the appended claims.

What is claimed is:

1. A machine for making grids for electron emission devices comprising a mandrel for supporting a plurality of wires, a reciprocal member for producing slots in said wires, means for successively actuating said member, means for holding the wire and member in the same relative positions during each slotting operation, means for rotating said mandrel, means for introducing another wire into said slots, means for deforming the edges of the slots to secure said last mentioned wire therein and means for interrupting the operation of said last mentioned means to produce a grid strip having alternate sections unsecured to said support-wires.

2. A machine of the class described comprising means for supporting a wire, a rotatable slotting-member, means for moving said member through a unidirectional path to operative relation with said wire to produce a slot, means for inserting a wire into said slot and means rotatable with said slotting member for displacing material of at least one edge of the slot to deform the metal.

3. A machine for making grids comprising a rotary head, an arbor in said head, means for moving a support wire over said arbor, means rotatable with said head for forming slots in said wire, means for inserting a wire in said slot, impact members for deforming the metal at the edges of said slots and means for interrupting the actuation of said impact members.

4. A machine for making grids comprising an arbor, means for rotating said arbor, means for moving a support-wire over said rotating arbor, a member for forming slots in said support-wire and means for maintaining said member and said arbor in a constant relative position during a rotation of the arbor for the slot forming operation.

5. A machine for making grids comprising an arbor, means for rotating said arbor, means for moving a support-wire over said rotating arbor, a member for forming slots in said support-wire, means for maintaining said member and said arbor in a constant relative position during a rotation of the arbor for the slot forming operation, means for inserting another wire into slots formed in said support-wire and means for securing said last mentioned wire to the support-wire.

6. A machine for making grids comprising an arbor, means for rotating said arbor, means for moving a support-wire over said rotating arbor, a member for forming slots in said support-wire, means for maintaining said member and said arbor in constant relative positions during a rotation of the arbor for the slot forming operations, means for inserting another wire into slots formed in said support-wire and means for deforming the edges of said slots to secure said last mentioned wire therein.

7. A machine for making grids comprising an arbor for holding a support-wire, means for rotating said arbor and the support-wire thereon, reciprocal slotting-members rotatable with said arbor and means for actuating said members to form slots in said support-wire.

In testimony whereof, I have hereunto subscribed my name this 9th day f December, 1926.

JOSEPH KIRBY.